(12) United States Patent
Bloemer et al.

(10) Patent No.: US 6,443,345 B1
(45) Date of Patent: *Sep. 3, 2002

(54) PIVOTING EXTENSIBLE REAR HITCH ATTACHMENT FOR EQUIPMENT CARRIER

(75) Inventors: John M. Bloemer, Sun Prairie; Clarence A. Anderson, Middleton, both of WI (US)

(73) Assignee: Graber Products, Inc., Madison, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/612,822

(22) Filed: Jul. 10, 2000

Related U.S. Application Data

(63) Continuation of application No. 09/115,979, filed on Jul. 15, 1998, now Pat. No. 6,085,954.

(51) Int. Cl.$^7$ ................................. B60R 9/00
(52) U.S. Cl. ................. 224/519; 224/502; 224/509; 224/532; 224/924
(58) Field of Search ................. 224/519, 509, 224/502, 532, 924

(56) References Cited

U.S. PATENT DOCUMENTS

| 995,771 | A | 6/1911 | Coyle |
| 1,135,517 | A | 4/1915 | Goss |

(List continued on next page.)

*Primary Examiner*—Gregory M. Vidovich
*Assistant Examiner*—Maerena W. Brevard
(74) *Attorney, Agent, or Firm*—Boyle, Fredrickson, Newholm, Stein & Gratz, S.C.

(57) ABSTRACT

An equipment rack incorporating four linked members which mount an equipment rack support to a hitch insert. The linked members are formed by two pairs of pivotally linked arms which in turn are pivotally inked to the hitch insert and to an equipment rack mounting bracket. Each pair of linked arms provides three pivot bearings which have mutually parallel axes. In the collapsed position the linked arms making up each pair are parallel and the equipment rack support and hitch insert are in juxtaposition. In the extended position the arms making up each pair are substantially co-linear. A mechanical link locks the rack support to the hitch insert when the rack is retracted against the rear of the vehicle.

24 Claims, 5 Drawing Sheets

U.S. PATENT DOCUMENTS

| | | |
|---|---|---|
| 1,860,920 A | 5/1932 | Barker |
| 1,886,911 A | 11/1932 | Schulman |
| 1,912,958 A | 6/1933 | Widener |
| 1,979,809 A | 11/1934 | Newton |
| 3,202,332 A | 8/1965 | Walker |
| 3,350,065 A | 10/1967 | Mankey |
| 3,529,737 A | 9/1970 | Daugherty |
| 4,400,129 A | 8/1983 | Eisenberg et al. |
| 4,976,386 A | 12/1990 | Geiger |
| 5,094,373 A | 3/1992 | Lovci |
| 5,114,120 A | 5/1992 | Bartelt et al. |
| 5,190,195 A | 3/1993 | Fullhart et al. |
| 5,303,857 A | 4/1994 | Hewson |
| 5,443,189 A | 8/1995 | Hirschfeld |
| 5,454,496 A | 10/1995 | Sumida et al. |
| 5,489,110 A | 2/1996 | Van Dusen |
| 5,518,159 A | 5/1996 | DeGuevara |
| 5,527,146 A | 6/1996 | Allsop et al. |
| 5,529,231 A | 6/1996 | Burgess |
| 5,544,799 A | 8/1996 | Didlake |
| 5,570,825 A | 11/1996 | Cona |
| 5,586,702 A | 12/1996 | Sadler |
| 5,626,059 A | 5/1997 | Bobbitt, III et al. |
| 5,664,717 A | 9/1997 | Joder |
| 5,673,834 A | 10/1997 | Cannon |
| 5,680,976 A | 10/1997 | Koliopoulos et al. |
| 5,685,686 A | 11/1997 | Burns |
| 5,730,345 A | 3/1998 | Yeckley et al. |
| 5,842,615 A | 12/1998 | Goodness |
| 5,845,831 A | 12/1998 | Nusbaum et al. |
| 5,845,832 A | 12/1998 | Eichmann |
| 5,853,278 A | 12/1998 | Frantz |
| 5,862,966 A | 1/1999 | Mehls |
| 5,884,826 A | 3/1999 | Shaver |
| 5,950,890 A | 9/1999 | Darby |
| 5,996,870 A | 12/1999 | Shaver |
| 6,062,451 A | 5/2000 | Lassanske et al. |
| 6,085,954 A | 7/2000 | Bloemer et al. |
| 6,089,430 A | 7/2000 | Mehls |
| 6,105,843 A | 8/2000 | Dollesin |
| 6,123,498 A | 9/2000 | Surkin |
| 6,126,053 A | 10/2000 | Shaver |

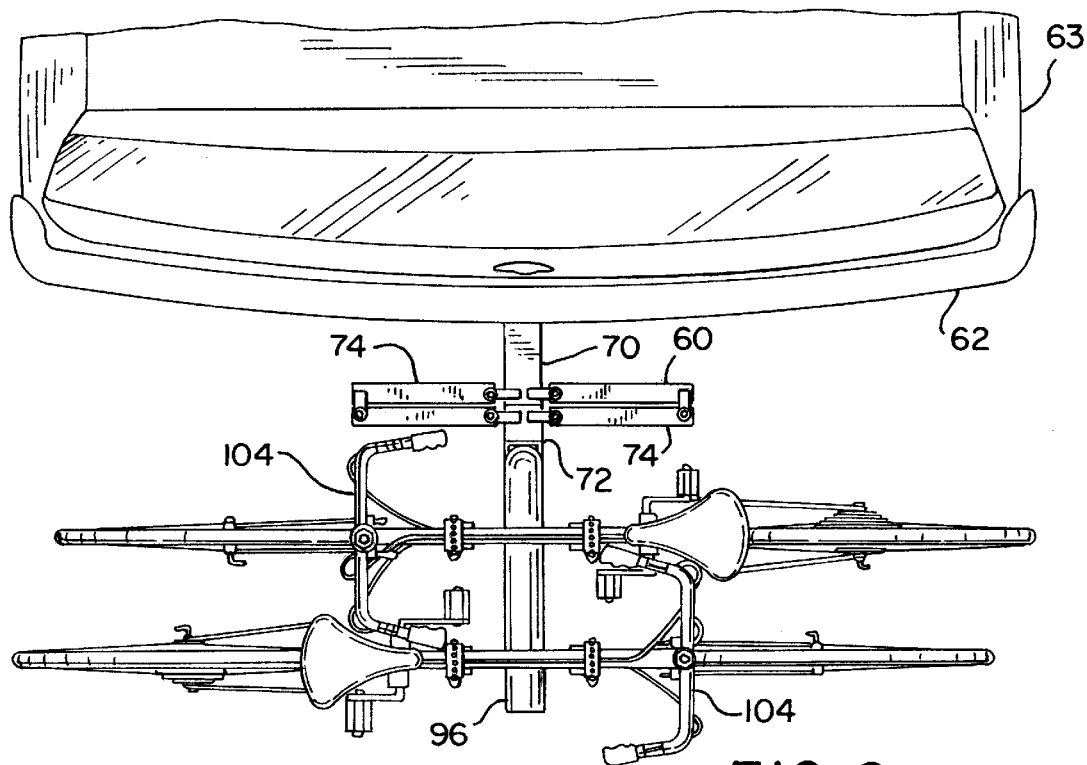
FIG. 2
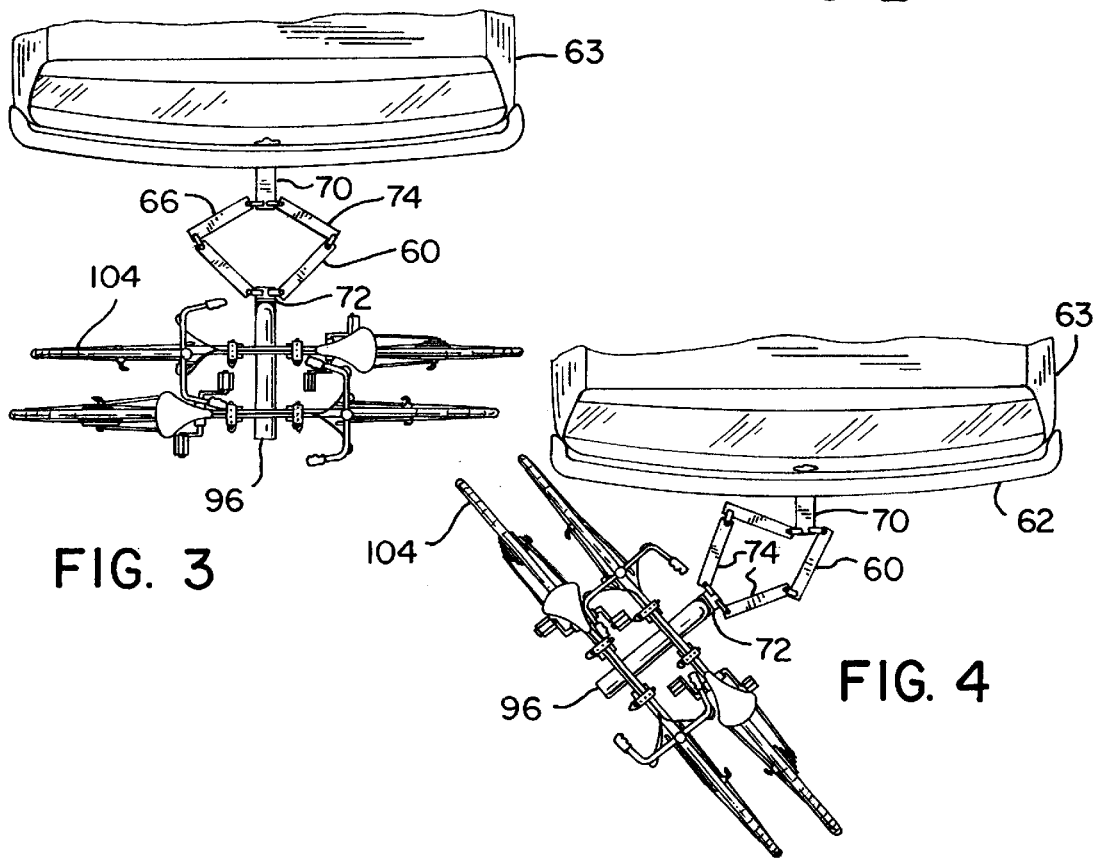
FIG. 3
FIG. 4

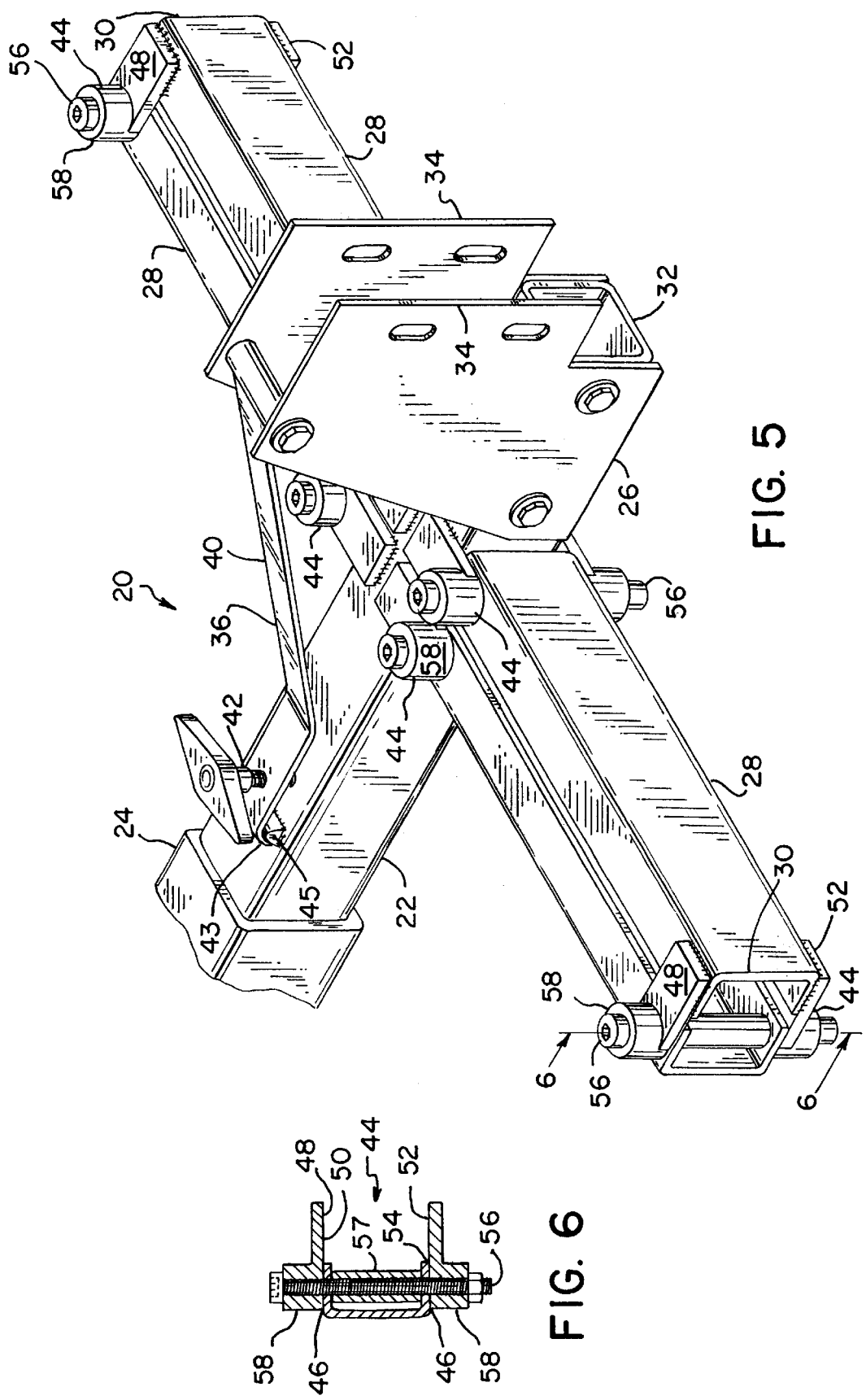

PIVOTING EXTENSIBLE REAR HITCH ATTACHMENT FOR EQUIPMENT CARRIER

This application is a continuation of Ser. No. 09/115,979 filed Jul. 15, 1998 now U.S. Pat. No. 6,085,954.

FIELD OF THE INVENTION

The present invention relates to bicycle racks and other equipment carriers which mount to a trailer hitch at the rear of a vehicle.

BACKGROUND OF THE INVENTION

The development of equipment racks, particularly bike racks which mount bikes or other recreational equipment to the exterior of an automobile has undergone a number of evolutionary steps. There are in general three general types of racks: roof racks, trunk racks, and hitch racks. Recently hitch racks, that is equipment carriers that mount to a trailer hitch at the rear of a vehicle, have become more popular. This popularity is related to the rise of the sport utility vehicle and the wide use of trucks for urban passenger vehicles. Whereas in the past a trailer hitch was a fairly specialized item normally only purchased by those with a trailer to pull, now a wide variety of vehicles come with trailer hitches as standard equipment or as part of a package of options.

A rack which attaches to a trailer hitch has many advantages. A trailer hitch provides a standard interface designed to support substantial loads. Installing and removing a rack from a trailer hitch is normally simpler then mounting a carrier directly to a vehicle. A stronger equipment rack, capable of carrying a larger number of bikes or other equipment, is more easily accommodated by a rack mounted to a hitch which is designed to support substantial hitch loads. The rack is also located at the rear of the vehicle where aerodynamic drag is not affected by the presence of additional equipment by virtue of being positioned in the turbulent wake region behind a vehicle.

One problem with a rack or cargo carrier which mounts to a trailer hitch at the rear of a vehicle is that the rack may prevent access to the rear door of the vehicle. Although some racks may be designed to pivot away from the rear door, if the rack is supporting a substantial weight in equipment, the bikes or other cargo must be unloaded before the cargo rack is tilted to gain access to the rear of the vehicle. Several existing devices have employed springs or gas shock to balance the weight of equipment particularly bikes, to allow the loaded rack to be pivoted downwardly away from the rear door. However if the rack is unloaded it now becomes difficult to pivot because the force of the spring or gas shock must be overcome. In some circumstances considerable force must be exerted on the rack at the same time that a latch or release must be actuated. This results in needing a combination of strength and dexterity to move the rack towards or away from its carrying position behind the vehicle.

The usefulness of a cargo rack increases as the simplicity and ease of use increases. Potential purchasers of cargo racks for use with trailer hitch mounts behind vehicles are typically concerned not only with simplicity and ease of use but cost and durability.

What is needed is a mechanism for mounting an equipment rack to a trailer hitch which provides access to the rear of the vehicle and in which movement of the rack is not significantly affected by whether the rack is supporting equipment or is empty.

SUMMARY OF THE INVENTION

The equipment rack of this invention incorporates four linked members which mount an equipment rack support to a hitch insert. The linked members are formed by two pairs of pivotally linked arms which in turn are pivotally linked to the hitch insert and to an equipment rack mounting bracket. Each pair of linked arms provides three pivot bearings which have mutually parallel axes, the entire rack mechanism thus incorporates six pivot axes. The individual arms are constructed of torsionally stiff members. In the collapsed position the linked arms making up each pair are parallel and the equipment rack support and hitch insert are in juxtaposition. In the rearwardly extended position the arms making up each pair are substantially co-linear. As the equipment rack rotates to one side of the vehicle the arms assumed a bend but extended configuration. The equipment rack support and hitch insert are separated by a distance approximately equal to twice the length of an individual arm.

Each pivot bearing which attaches an arm to the rack support or the hitch insert is formed between structural extensions from the arms which overlie the arms and the rack support or hitch insert. These structural extensions prevent interference between the arms and the hitch insert and rack support when the arms pivot with respect to them. Similarly structural extensions extend from one of each pair of arms and overlie the connected arms to allow the arms to pivot without interference. For greater rigidity between the rack support and the hitch insert a mechanical link which locks the rack support to the hitch insert is provided when the linked members position the rack support and hitch insert in juxtaposition. Maximum rigidity is only required while the vehicle is in actual motion and the rack is retracted against the rear of the vehicle.

It is an object of the present invention to provide a mechanism for mounting an equipment rack to a vehicle trailer hitch which allows access to the rear door of the vehicle.

It is a further object of the present invention to provide a means for moving a loaded or empty rack away from the rear of a vehicle to gain access to the rear of the vehicle without the necessity of applying significant force.

Further objects, features and advantages of the invention will be apparent from the following detailed description when taken in conjunction with the accompanying drawings.

BRIEF DESCRIPTION OF THE DRAWINGS

FIG. 2 is a top plan view of the rear of a vehicle showing the rack extending mechanism in its collapsed position.

FIG. 3 is a top plan view of the rack mechanism of FIG. 2 partly extended to the rear of the vehicle.

FIG. 4 is a top plan view of the rear of the vehicle showing the rack extending mechanism of FIG. 3 completely extended and rotated to one side of the vehicle.

FIG. 5 is an isometric view of an alternative embodiment of the rack extending mechanism of this invention.

FIG. 6 is a cross-sectional view of the rack extending mechanism of FIG. 5 taken along section line 6—6.

DESCRIPTION OF THE PREFERRED EMBODIMENTS

Figure 1:
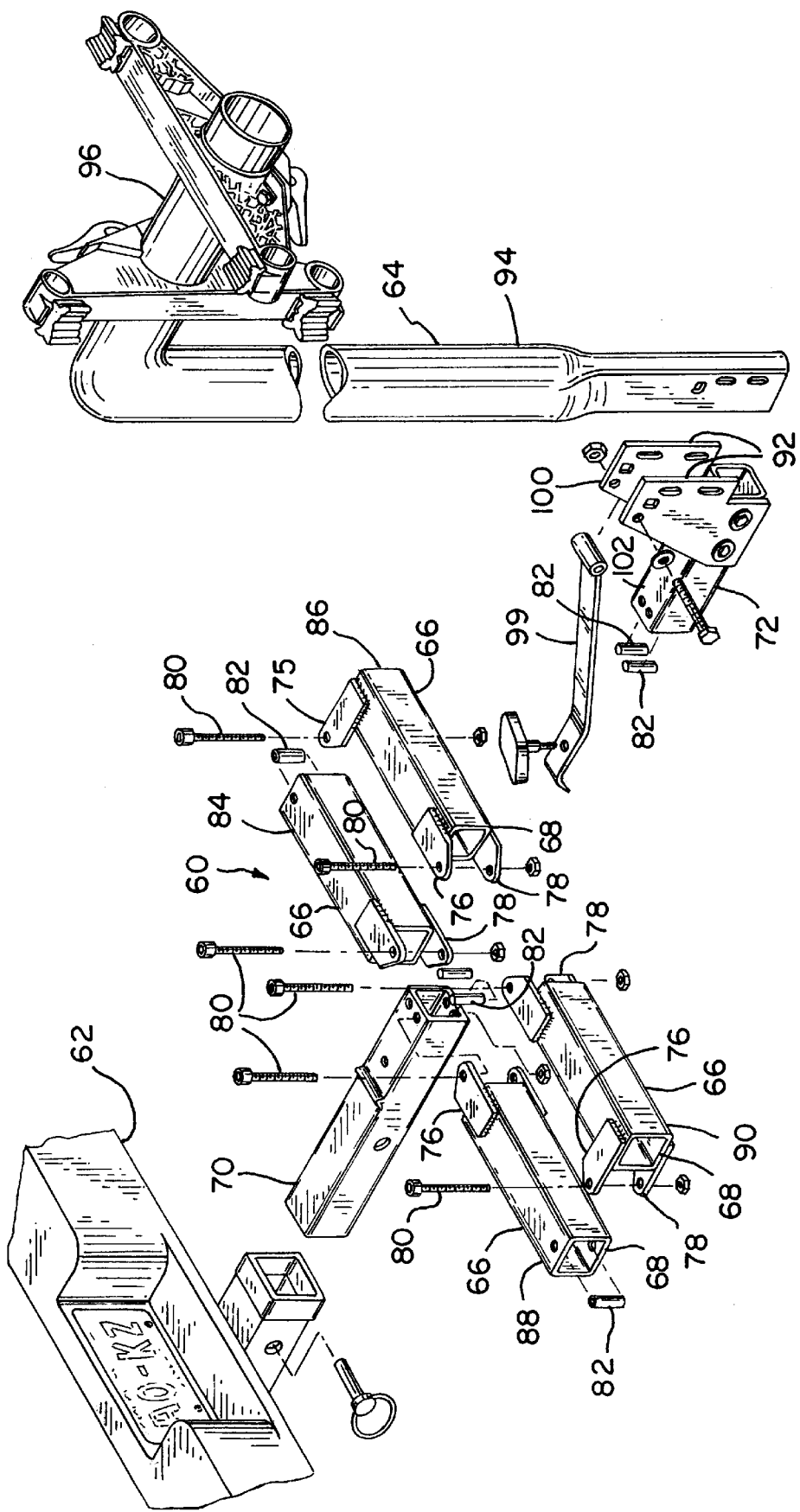
FIG. 1 is an exploded isometric view of the rack extending mechanism of this invention.

Referring more particularly to FIGS. 1–8 wherein like numbers refer to similar parts a bike rack extension mechanism 20 is shown in FIG. 5. The rack extension mechanism 20 is composed of a hitch mounting bracket 22 which has a square cross-section tube 38 and which is received in a trailer hitch 24, and a rack mounting bracket 26 joined by four linked arms 28. Two of the arms 28 are pivotally linked to form two linked pairs 30. The linked pairs of arms 30 are pivotally connected at either end between the hitch mounting bracket 22 and the rack mounting bracket 26.

The rack mounting bracket 26 incorporates a square tube section 32 and a pair of upstanding flanges 34 to which an equipment carrying rack may be connected. A strap 36 connects the upstanding flanges 34 to the square tube section 38 of the hitch mounting bracket 22. The strap 36 forms a lock 40 which, by means of a bolt 42, connects the strap 36 to the hitch mounting bracket 22 when the hitch mounting bracket 22 and the rack mounting bracket 26 are in juxtaposition. The lock 40 has two conditions, the first where the lip 43 of the strap 36 engages an interlocking projection 45 on the hitch mounting bracket 22. The second is when the bolt 42 engages threads in the mounting bracket 22 securely joining strap 36 to the mounting bracket 22. The arms 28 are formed of structural steel C-channels in order to provide torsional and bending stiffness to support the weight of bikes or other equipment which is mounted to the rack mounting bracket 26.

Bearing mechanisms 44, best shown in FIG. 6, provide for rotation of the arms 28 with respect to each other and the hitch mounting bracket 22 and the rack mounting bracket 26. Each bearing mechanism 44 incorporates two bearings 46 formed between upper bearing extension plates 48 and upper surfaces 50 of the C-channel and lower bearing plates 52 and lower surfaces 54 of the C-channel. The vertically arrayed bearings 46 form a bearing axis coincident with the bearing bolt 56 which joins the arms 28 to each other and the hitch mounting bracket 22 and the rack mounting bracket 26. Bolt sleeves 57 prevent localized crushing or excessive loading of the C-section, thus preventing the upper surfaces 50 from being forced by tightening of the nuts 59 toward the lower surfaces 54.

The spaced apart bearings 46 form stiff mechanical joints which, in combination with the structural section making up the arms 28, provide the structural strength to support a substantial load of up to several hundred pounds. The stiffness of a structural element in bending is a combination of its sectional modulus and the length of the element and how it is supported. The overall stiffness of the arms 28 and the bearings 46 is accomplished by a combination of using a stiff structural cross-section to form the arms and short extensions formed by bearing plates 48 which are rigidly mounted to one arm 28 and have structural bosses 58 which reinforce the bearings 46.

Another rack extension mechanism 60 of this invention is shown in FIG. 1. The rack extension mechanism is positioned between a rear bumper 62 of a vehicle 63 and a bicycle rack 64. The rack extension mechanism 60 is has arms 66 which are constructed from square tube sections 68 to maximize arm stiffness, in particular torsional stiffness. The rack extension mechanism 60 has a hitch mounting bracket 70 and an equipment mounting bracket 72 which are joined by pairs 74 of arms 66. The six bearings which join the arms 66 to the hitch mounting bracket 70 and the equipment mounting bracket 72 are formed by upper plates 76 and lower plates 78 which extend from the arms 66 to overlap adjacent structural sections. The plates 76, 78 form bearings with bearing bolts 80 and the structural section through which the bolts pass. The structural section through which the bearing is mounted is supported by a bearing sleeve 82.

The rack extension mechanism 60, as shown in FIGS. 1–4, has a first arm 84 which is pinned to the right side of the hitch mounting bracket. When the rack extension 60 is in its retracted position the first arm 84 extends substantially perpendicular to the hitch mounting bracket 70. A second arm 86 has two sets of plates 76, 78. One set extends perpendicular to the second arm 86 to join the second arm to the first arm 84. Another set of plates 76, 78 extends parallel to the second arm 86 and joins the second arm to the equipment support bracket 72. The second arm 86 is substantially parallel to the first arm 84 when the extension mechanism 60 is in its retracted position as shown in FIG. 3. A third arm 88 and fourth arm 90 are arranged opposite and in mirror symmetry to the first and second arms 84, 86.

The bike rack 64 is attached by bolts or pins (not shown) to support flanges 92 which are bolted or welded to the rack mounting bracket 72. The bike rack has a long vertically extending section 94 and a shorter horizontal section 96 to which bike support brackets are mounted.

A fully loaded rack 64 produces a moment arm which acts to twist the arms 66. This moment produced by the weight of the equipment supported on the rack is best countered by a structural connection 99 which is anchored to the hitch mounting bracket 70 and which extends to a point 100 on the equipment support bracket 72 which is elevated above a horizontal plane containing the portion 102 of the equipment support bracket 72 which abuts the hitch mounting bracket 70. The rack extension mechanism 60 not only allows the equipment rack to be extended to the rear of a vehicle but also allows the equipment rack to be rotated about the bearings between the arms and the hitch mounting bracket 70 and the bearings between the arms and the equipment mounting bracket 72.

The balanced nature of the rack extension mechanisms 20, 60 of this invention will generally allow the bike rack 64 or other equipment rack to be positioned, even when loaded, without requiring pins or locking mechanisms.

The rack extension mechanisms 20, 60 will typically provide an extension of the rack mounting bracket 26, 72 of about 16 inches or however much is necessary to allow the rear door or doors of a vehicle to be opened. Thus the individual arms 28, 66 will be about 8 inches long.

The rack extension mechanism 20, 60 will typically be installed in a rear trailer hitch in a collapsed and lock condition. Bikes 104 are then mounted to the rack 64. If access to the rear of the vehicle 63 is desired the structural connection 99 is unlocked releasing the equipment mounting bracket 72 from the hitch mounting bracket 70. The loaded rack 64 may then be pulled to the rear and/or to the side of the vehicle 63 as shown in FIGS. 3 and 4. The unique construction of the extension mechanism 20, 60 with the pairs of linked arms results in a stiff structure which deflects little under the load of the bikes 104, is compact when collapsed, and allows placement of the bikes anyway within a circle defined by the link arms.

Figure 7:
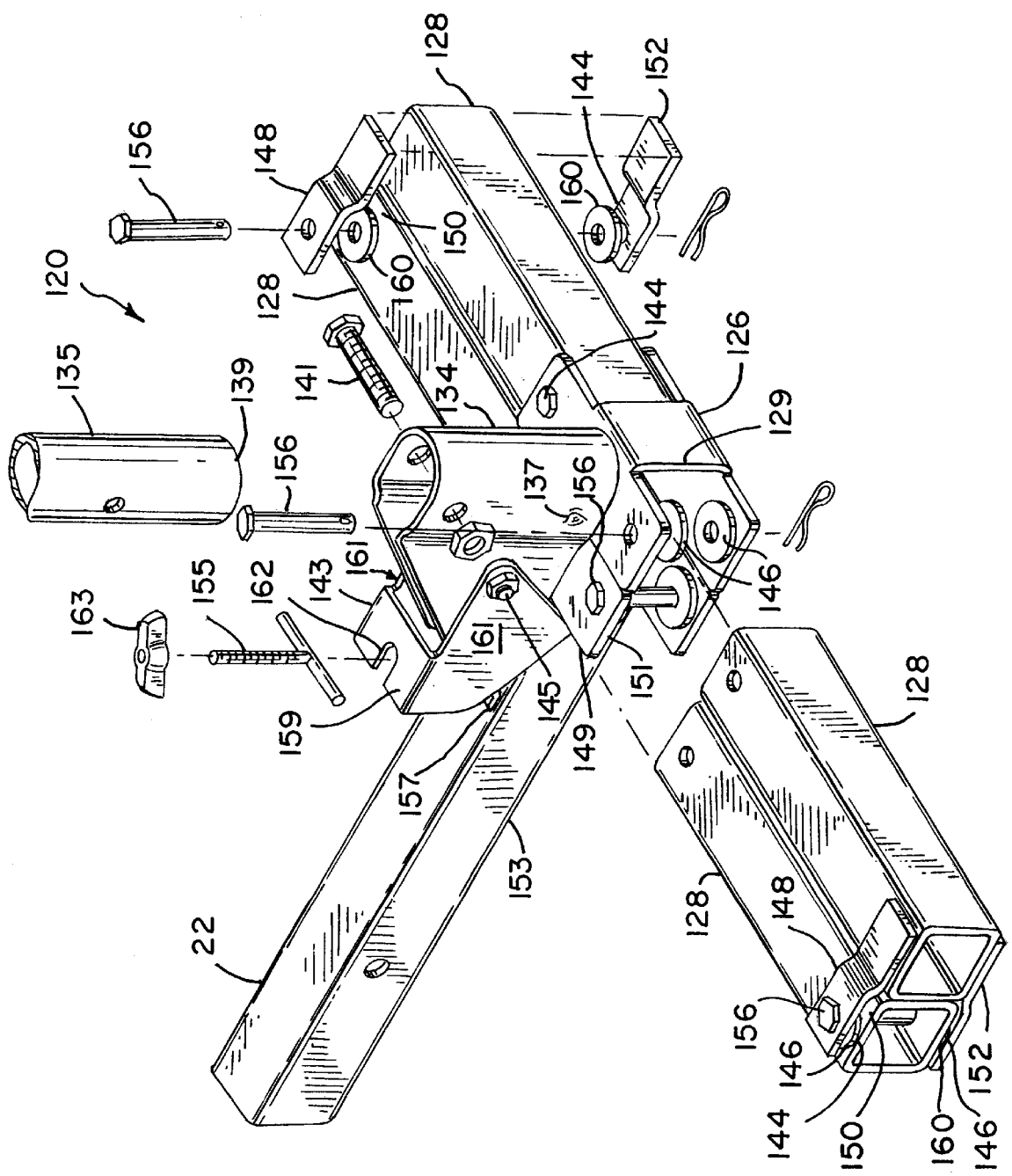
FIG. 7 is a partly exploded isometric view of an alternative rack extending mechanism of invention.

A further embodiment rack extension mechanism 120 is shown in FIG. 7. The extension mechanism 120 includes a hitch attachment bracket 122 and a rack mounting bracket 126. Four linked arms 128 connect the hitch attachment bracket 122 to the rack mounting bracket 126 in a manner similar to that employed in the rack extension mechanism 20 shown in FIG. 5 and in the rack extension mechanism 60 shown in FIGS. 1–4.

The rack mounting bracket 126 incorporates a metal stamping 129 which is welded to a bracket 134 to which an equipment carrying rack 135 is connected. The bracket 129 forms a first and a second spaced apart pivot attachment portions through which bearing pins 156 may be placed to connect arms 128. The bracket wraps around the tubular base of the carrying rack 135. Protrusions 137 extend inwardly from the tubular portion at the bottom 139 of the rack 135 within the bracket 134. A bolt 141 locks the rack 135 to the bracket 134.

Figure 8:
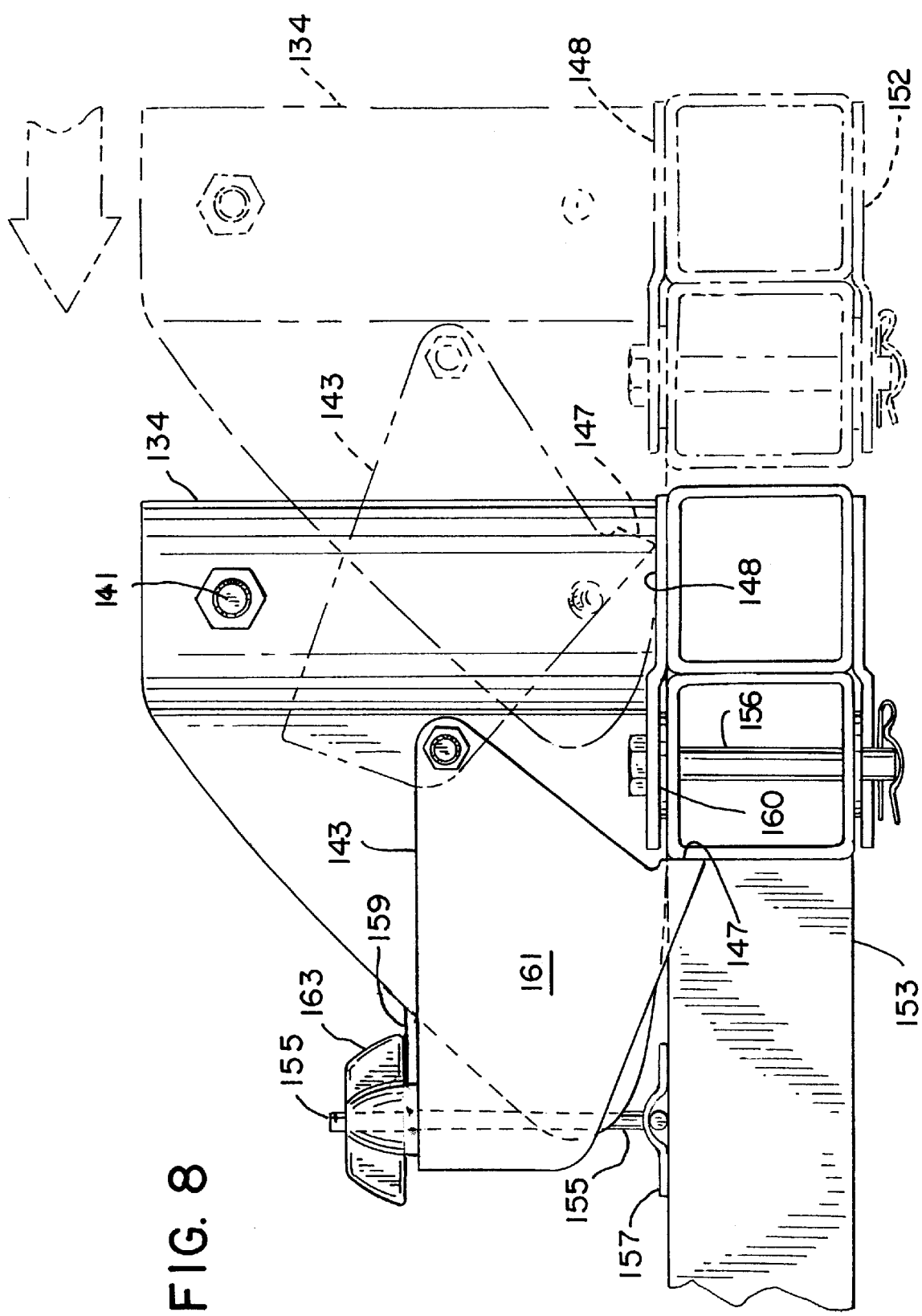
FIG. 8 is a side elevational view of the rack extending mechanism of FIG. 7 showing motion of the mechanism as it moves towards a locked position.

A locking hasp 143 is pivotally mounted by a bolt 145 to the bracket 134. The locking hasp 143 has a catch surface 147 which engages the back side 149 of a second metal stamping 151 which is welded to the square tube section 153 of the hitch attachment bracket 122. The metal stamping 151 is identical to the metal stamping 129 and likewise forms a first and a second spaced apart pivot attachment portions through which bearing pins 156 may be placed to connect arms 128. As shown in FIG. 8, collapsing the rack extension mechanism 120 brings the rack mounting bracket 126 into juxtaposition with the hitch attachment bracket 122, with the result that the hasp 143 slides over the top of the metal stamping 129. The weight of the hasp 143 latches the rack mounting bracket 126 to the hitch attachment bracket 122. A secondary latch is formed by a T-bolt 155 which is attached to the tube section 153 by a metal strap 157. The T-bolt passes through a slot 162 in an upwardly facing flange 159 which connects the sides 161 of the hasp 143. A handle 163 is threaded onto the T-bolt and engages the flange 159 to draw the flange towards the tubular section 153. The bolt 145 acts as a fulcrum and the upwardly facing flange 159 acts as a lever arm which applies mechanical advantage to the catch surfaces 147 which draws the metal structures 129, 157 together.

A load path which extends from a portion of the rack mounting bracket above the plane containing the arms 128 and extending downward to the tube section 153 where the metal strap 157 is mounted, provides a means to counteract the bending load imposed on the rack extension mechanism 120 by the weight of bikes or other equipment which is attached to the equipment carrying rack 135.

The arms 128 are formed of structural steel square section in order to provide torsional and bending stiffness to support the weight of bikes or other equipment which is mounted to the equipment carrying rack 135.

Bearing mechanisms 144, best shown in FIG. 7, provide for rotation of the arms 128 with respect to each other and the hitch mounting bracket 122 and the rack mounting bracket 126. Each bearing mechanism 144 incorporates two bearings 146 formed between upper bearing extension plates 148 and upper surfaces 150 of the square arm sections and lower bearing plates 152 and lower surfaces 154 of the square section. The bearing plates 148, 152 may be formed as metal stampings and are welded to the arms 128 which do not receive the pins 156. Washers 160, which are constructed of low friction material such as TEFLON® plastic or other plastic, or sintered metal are positioned between the extension plates 148, 152 and the upper surfaces 150 to reduce bearing friction. One or two washers may be used to form each bearing 146.

The vertically arrayed bearings 146 form a bearing axis coincident with the bearing pins 156 which join the arms 128 to each other and the hitch mounting bracket 122 and the rack mounting bracket 126. Bolt sleeves are not necessary if the joints between the arms are pinned together as shown in FIG. 7.

It should be understood that the arms 28, 66, 128 can be constructed of any structural section such as a I-beam, Square section, or C-channel, which has a cross-section with a high moment of inertia relative to the section weight so that on a pound to pound comparison the structural member has a high bending and torsional stiffness. Simple solid structural sections such as bars have insufficient bending stiffness or too high a sectional weight.

It is understood that the invention is not limited to the particular construction and arrangement of parts herein illustrated and described, but embraces such modified forms thereof as come within the scope of the following claims.

What is claimed is:

1. An equipment-carrying rack system for mounting to a vehicle trailer hitch, comprising:

a hitch attachment member adapted for engagement with the vehicle trailer hitch;

a rack arrangement including a rack support member and an equipment rack mounted to the rack support member; and a rack extension arrangement interposed between the hitch attachment member and the rack support member, comprising first and second pivotally interconnected arm members and third and fourth pivotally interconnected arm members, wherein the first and third arm members are pivotally interconnected with the hitch attachment member and the second and fourth arm members are pivotally interconnected with the rack support member, wherein the arm members are movable between a collapsed position in which the arm members are operable to position the hitch attachment member and the rack support member in close proximity to each other, and an extended position in which the arm members are operable to move the rack support member outwardly away from the hitch attachment member.

2. The rack system of claim 1, wherein the first and second arm members and the third and fourth arm members are pivotally interconnected with each other for movement about substantially parallel vertically oriented pivot axes, and wherein the first and third arm members and the second and fourth arm members are pivotally interconnected with the hitch attachment member and the rack support member, respectively, for movement about respective pivot axes which are oriented substantially vertically.

3. The rack system of claim 2, wherein the first and second arm members and the third and fourth arm members are each pivotally interconnected via an axially extending connector member, and wherein an axially extending connector member interconnects each of the first and third arm member with the hitch attachment member and an axially extending connector member interconnects each of the second and fourth arm member with the rack support member.

4. The rack system of claim 1, further comprising a latch arrangement for selectively maintaining the arms in the collapsed position.

5. The rack system of claim 4, wherein the latch arrangement is interposed between the hitch attachment member and the rack support member.

6. The rack system of claim 1, wherein the arm members are interconnected with each other and configured so as to enable the rack support member to be moved rearwardly and laterally relative to the hitch attachment member.

7. The rack system of claim 1, wherein the first and second arm members and the third and fourth arm members are located on opposite sides of the hitch attachment member and the rack support member when the arm members are in the collapsed position.

8. The rack system of claim 7 wherein, when the arm members are in the collapsed position, the first and third arm members are substantially aligned with each other and the second and fourth arm members are substantially aligned with each other.

9. The rack system of claim 8 wherein, when the arm members are in the collapsed position, the first and second arm members are substantially parallel to each other and the third and fourth arm members are substantially parallel to each other.

10. The rack system of claim 1, wherein the first, second, third and fourth arm members cooperate to define a variable open configuration caused by movement of the rack support member rearwardly and/or laterally relative to the hitch attachment member.

11. An equipment carrying rack system for mounting to a vehicle trailer hitch, comprising:
a hitch attachment member adapted for engagement with the vehicle trailer hitch;
a rack arrangement including a rack support member and an equipment rack mounted to the rack support member; and
a variable configuration rack positioning arrangement interposed between the hitch attachment member and the rack support member, comprising first and second pairs of pivotably interconnected arms, wherein one arm of each arm pair is pivotably interconnected with the hitch attachment member and wherein another arm of each arm pair of pivotably interconnected with the rack support member, wherein the pivotable interconnections between the arms in each arm pair and between each arm pair and the hitch attachment member and the rack support member cooperate to enable the first and second arm pairs to move between a collapsed configuration in which the arms of each arm pair are moved together to position the rack support member in close proximity to the hitch attachment member, and a variable open configuration in which the arms of each arm pair are moved apart from each other, wherein the variability of the open configuration of the first and second arm pairs enables the hitch attachment member to move rearwardly and laterally relative to the hitch attachment member.

12. The rack system of claim 11, wherein each of the first and second arm pairs comprises an inner arm and an outer arm, wherein each inner arm is interconnected with one of the outer arms by a substantially vertical pivot connection.

13. The rack system of claim 12, wherein each inner arm is interconnected with the hitch attachment member via a vertical pivot connection and wherein each outer arm is interconnected with the rack support member via a vertical pivot connection.

14. The rack system of claim 13, further comprising a latch arrangement interposed between the rack support member and the hitch attachment member for selectively maintaining the first and second arm pairs in the collapsed configuration.

15. The rack system of claim 13, wherein the first and second arm pairs cooperate to define a variable configuration four-sided figure upon movement of the rack support member rearwardly and laterally relative to the hitch attachment member, wherein the pivotable connection of the inner arm members to the hitch attachment member functions to provide a fixed position for the inner ends of two of the sides of the four-sided figure.

16. A method of positioning an equipment rack relative to a trailer hitch mounted to a vehicle, comprising the steps of:
engaging a hitch attachment member with the vehicle trailer hitch;
engaging the equipment rack with a rack support member; and
interconnecting first and second pairs of arm members with and between the hitch attachment member and the rack support member, wherein each pair of arm members includes inner and outer arm members pivotably interconnected with each other, and wherein each inner arm member is pivotably interconnected with the hitch attachment member and each outer arm member is pivotably interconnected with the rack support member.

17. The method of claim 16, further comprising the step of moving the rack support member rearwardly and laterally relative to the hitch attachment member, wherein the inner and outer arm members of the first and second arm pairs function to define a four-sided figure, the configuration of which is variable upon rearward and lateral movement of the rack support member relative to the hitch attachment member.

18. The method of claim 17, further comprising the step of selectively engaging the rack support member with the hitch attachment member to maintain the first and second pairs of arm members in a collapsed position in which the rack support member is located in close proximity to the hitch attachment member.

19. An equipment-carrying rack system for mounting to a vehicle trailer hitch, comprising:
a hitch attachment member adapted for engagement with the vehicle trailer hitch;
a rack arrangement including a rack support member and an equipment rack mounted to the rack support member; and
a linkage located between the hitch attachment member and the rack support member, wherein the linkage includes a series of link members which are constructed and arranged so as to provide simultaneous movement of the rack support member away from the hitch attachment member and about a pivot axis defined by a rearward portion of the hitch attachment member, wherein the linkage comprises:
a first arm having a first end and a second end, the first arm being pivotably mounted at its first end to the hitch attachment member;
a second arm having a first end and a second end, wherein the first end of the second arm is pivotably mounted to the second end of the first arm and wherein the second end of the second arm is pivotably interconnected with the rack support member;
a third arm having a first end and a second end, wherein the first end of the third arm is pivotably interconnected with the hitch attachment member; and
a fourth arm having a first end and a second end, wherein the first end of the fourth arm is pivotably interconnected with the second end of the third arm, and wherein the second end of the fourth arm is pivotably interconnected with the rack support member.

20. The rack system of claim 19, further comprising a latch mechanism interposed between the hitch attachment member and the rack support member.

21. The rack system of claim 19, wherein the pivotable interconnections between the hitch attachment member, the first arm, the second arm, the third arm, the fourth arm and the rack support member each comprise a bearing member defining a vertical pivot axis.

22. An equipment-carrying rack system for mounting to a vehicle trailer hitch, comprising:
- a hitch attachment member adapted for engagement with the vehicle trailer hitch;
- a rack arrangement including a rack support member and an equipment rack mounted to the rack support member; and
- a rack extension arrangement interposed between the hitch attachment member and the rack support member, comprising a pair of arm members pivotably interconnected with each other, wherein a first one of the arm members is pivotably interconnected with the hitch attachment member and a second one of the arm members is pivotably interconnected with the rack support memeber, wherein the arm members are pivotally interconnected with each other for movement about a first, vertically oriented pivot axis, and wherein the first and second arm members are pivotally interconnected with the hitch attachment member and the back support member, respectively, for movement about respective second and third pivot axes which are oriented substantially vertically, wherein the first and second arms members are substantially coplanar and are movable between a collapsed position in which the arm members are operable to position the hitch attachment member and the rack support member in close proximity to each other, and an extended position in which the arm members are operable to move the rack support member outwardly away from the hitch attachment member; and
- a latch arrangement interposed between the hitch attachment member and the rack support member for selectively maintaining the arms in the collapsed position.

23. An equipment carrying rack system for mounting to a vehicle trailer hitch, comprising:
- a hitch attachment member adapted for engagement with the vehicle trailer hitch;
- a rack arrangement including a rack support member and an equipment rack mounted to the rack support member; and
- a variable configuration rack positioning arrangement interposed between the hitch attachment member and the rack support member, comprising first and second pairs of pivotably interconnected arms, wherein one arm of each arm pair is pivotably interconnected with the hitch attachment member and wherein another arm of each arm pair is pivotably interconnected with the rack support member, wherein the arms in each arm pair are substantially coplanar and wherein the pivotable interconnections between the arms and the hitch attachment member and the rack support member cooperate to enable the first and second arms pairs to move between a collapsed configuration in which the arms of each arm pair are moved together to position the rack support member in close proximity to the hitch attachment member, and a variable open configuration in which the arms of each arm pair are moved apart from each other, wherein the variability of the open configuration of the first and second arm pairs enables the hitch attachment member to move rearwardly and laterally relative to the hitch attachment member.

24. An equipment-carrying rack system for mounting to a vehicle trailer hitch, comprising:
- a hitch attachment member adapted for engagement with the vehicle trailer hitch;
- a rack arrangement including a rack support member and an equipment rack mounted to the rack support member;
- a linkage located between the hitch attachment member and the rack support member, wherein the linkage includes first and second pairs of link members which are connected between the hitch attachment member and the rack support member, wherein the link members are interconnected together and arranged to move together so as to provide simultaneous movement of the rack support member away from the hitch attachment member and about a pivot axis defined by a rearward portion of the hitch attachment member, wherein the link members are attached by a number of substantially coplanar connections between the link members, the hitch attachment member and the rack arrangement; and
- a selectively engageable latch mechanism interposed between the hitch attachement member and the rack support member.

* * * * *

UNITED STATES PATENT AND TRADEMARK OFFICE
CERTIFICATE OF CORRECTION

PATENT NO.     : 6,443,345 B1
DATED          : September 3, 2002
INVENTOR(S)    : John M. Bloemer et al.

It is certified that error appears in the above-identified patent and that said Letters Patent is hereby corrected as shown below:

<u>Title page,</u>
Item [56], Reference Cited, please add -- FOREIGN PATENT DOCUMENTS, Great Britain    636,257    4/1950 --

<u>Column 6,</u>
Line 54, delete "member" and substitute therefore -- members --;
Line 57, delete "member" (1$^{st}$ occurrence) and substitute therefore -- members --;

Signed and Sealed this

Fourth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,443,345 B1
DATED         : September 3, 2002
INVENTOR(S)   : John M. Bloemer et al.

It is certified that error appears in the above-identified patent and that said Letters Patent is hereby corrected as shown below:

<u>Column 7,</u>
Line 34, after "pair" delete "of" and substitute therefore -- is --.

Signed and Sealed this

Sixth Day of January, 2004

JAMES E. ROGAN
*Director of the United States Patent and Trademark Office*